(12) United States Patent
Goren

(10) Patent No.: US 7,873,368 B2
(45) Date of Patent: *Jan. 18, 2011

(54) METHOD FOR TRACKING LOCATION OF A MOBILE UNIT

(75) Inventor: David P. Goren, Smithtown, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 260 days.

This patent is subject to a terminal disclaimer.

(21) Appl. No.: 12/194,785

(22) Filed: Aug. 20, 2008

(65) Prior Publication Data

US 2009/0047975 A1 Feb. 19, 2009

Related U.S. Application Data

(63) Continuation of application No. 10/852,347, filed on May 24, 2004, now Pat. No. 7,424,300.

(60) Provisional application No. 60/473,672, filed on May 23, 2003.

(51) Int. Cl.
*H04W 24/00* (2009.01)
*H04M 3/493* (2006.01)
*H04B 7/185* (2006.01)
*G01S 3/02* (2006.01)
*G01C 9/00* (2006.01)

(52) U.S. Cl. .............. 455/456.1; 455/456.2; 455/414.2; 455/423; 342/357.1; 342/451; 702/150

(58) Field of Classification Search ... 455/456.1–456.6, 455/414.2, 423; 342/357.1, 451; 702/150
See application file for complete search history.

(56) References Cited

U.S. PATENT DOCUMENTS

| | | | | |
|---|---|---|---|---|
| 6,052,598 | A * | 4/2000 | Rudrapatna et al. | 455/456.1 |
| 6,064,339 | A * | 5/2000 | Wax et al. | 342/417 |
| 6,084,546 | A * | 7/2000 | Wax et al. | 342/378 |
| 6,148,211 | A * | 11/2000 | Reed et al. | 455/456.2 |
| 6,393,294 | B1 * | 5/2002 | Perez-Breva et al. | 455/456.5 |
| 6,873,852 | B2 * | 3/2005 | Koorapaty et al. | 455/458 |
| 2004/0095276 | A1 * | 5/2004 | Krumm et al. | 342/465 |
| 2004/0150551 | A1 * | 8/2004 | Artebrant et al. | 342/95 |
| 2004/0152470 | A1 * | 8/2004 | Spain | 455/456.1 |

* cited by examiner

*Primary Examiner*—Vincent P Harper
*Assistant Examiner*—Ariel Balaoing

(57) ABSTRACT

Location of a mobile unit is determined by a combined probability, derived from a first probability for possible locations based on a current sample of radio signal characteristics and a second probability that a unit has moved from a prior location or probable location to each possible location.

19 Claims, 1 Drawing Sheet

METHOD FOR TRACKING LOCATION OF A MOBILE UNIT

PRIORITY CLAIM

This application is a Continuation application of U.S. patent application Ser. No. 10/852,347 filed on May 24, 2004 which claims the benefit of the filing date of U.S. Provisional Application Ser. No. 60/473,672, filed May 23, 2003 and assigned to the same assignee as the present invention.

BACKGROUND OF THE INVENTION

This invention relates to systems for locating mobile units arranged for radio data communications with fixed devices, such as access points, using a wireless data communications protocol, such as IEEE Standard 802.11. In particular the invention relates to such systems wherein radio signal characteristics within an area wherein the mobile units operate, such as a factory, warehouse, school, hospital, retail establishment or other facility, are calibrated and stored in a database. Mobile units are located within the area by sampling radio communication characteristics between the mobile units and a plurality of access points, and comparing the sampled signals to the database. The characteristics may be signal strength as received by the access points, for example using the RSSI function of Standard 802.11 or may be time of arrival.

Typically such systems do not have calibrated values of signal characteristic for every possible location within the area. Often location must be determined by extrapolation between calibrated locations. Further, radio signal characteristics in many areas, particularly indoor areas are effected by signal fading, multipath and blockage. According any sample of signal characteristics can result in an ambiguous determination of location, since the effects of radio propagation may cause more than one location to have similar signal characteristics.

It is an object of the present invention to provide an improved system for locating mobile units, wherein location of the mobile units is tracked between radio signal samples to resolve ambiguous determinations of mobile unit location.

SUMMARY OF THE INVENTION

In accordance with the invention there is provided a method for locating within an area a mobile unit arranged for a wireless radio communications with fixed devices, wherein location is determined by comparing radio signal characteristics between the mobile unit and the fixed devices to a database relating said radio signal characteristics to location within the area.

Sequential samples of the radio signal characteristics are taken. For each sample of the radio signal characteristics, two or more possible locations for said mobile unit are determined and assigned a first probability that the mobile unit is at each of the possible locations. For each possible location determined using a sample after an initial sample, a second probability is determined that a mobile unit has moved from each possible location for one or more prior samples to the possible location. The second probability is derived from proximity of the possible location for the one or more prior samples and the possible locations for the current sample. A location is selected for the mobile unit as the most probable location for the current sample based on a combination of the first and second probabilities.

In one embodiment the first probability is assigned according to a comparison of the sampled radio signal characteristics to radio signal characteristics for the location in the database. In another arrangement, the database includes data characterizing quality of radio signal characteristics for locations within the area and the first probability is assigned according to the quality characterizing data. The second probability may be determined by comparing distance between the locations to expected distance for movement of the mobile unit in a time period between the samples. The second probability may be modified by factors constituting a barrier to movement between the possible location for the one or more prior samples and the possible location for a current sample.

For a better understanding of the present invention, together with other and further objects, reference is made to the following description, taken in conjunction with the accompanying drawings, and its scope will be pointed out in the appended claims.

DESCRIPTION OF THE INVENTION

Figure 1:
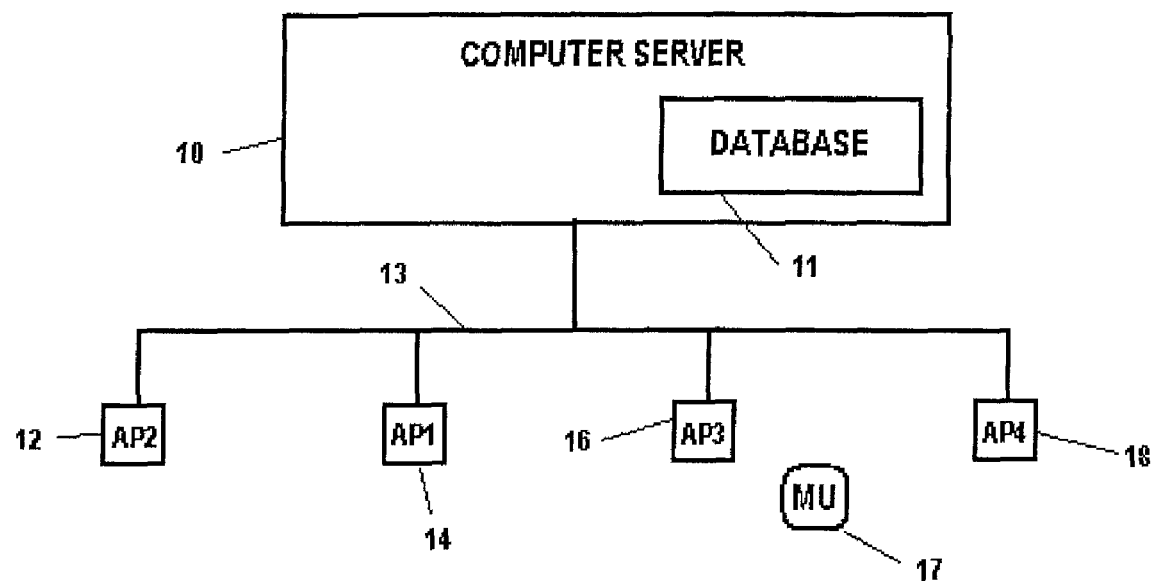
FIG. 1 is a block diagram showing an exemplary system in which the method of the invention may be practiced.
Figure 2:
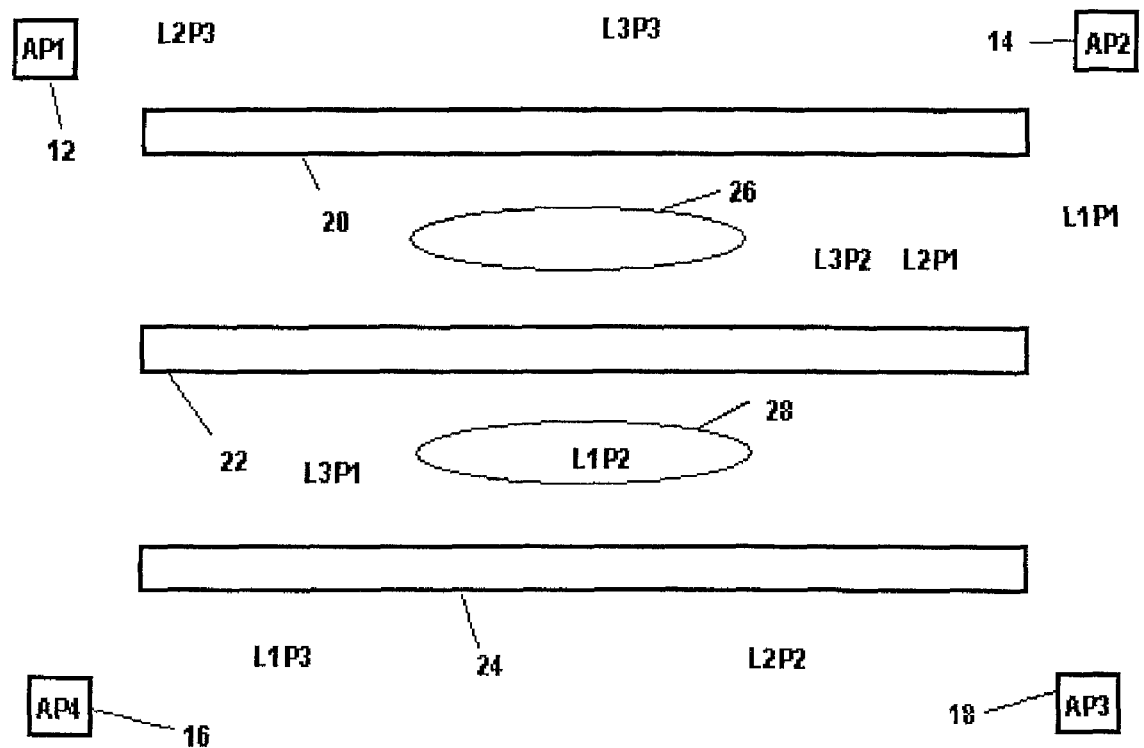
FIG. 2 is a floor plan illustrating the practice of the method of the present invention.

Referring to FIGS. 1 and 2 there is shown an example of a system for practicing the method of the present invention. A computer 10 is connected to access points 12, 14, 16 and 18 by a local area network 13. Access points 12, 14, 16, 18 communicate with mobile unit 17 by wireless data communications, using a protocol such as IEEE Standard 802.11. It will be recognized that the system of the present invention does not require that the communications between the access points and the mobile unit be bidirectional. It is possible to practice the method wherein the mobile units are simple transmitters that periodically send signals to the access points.

Computer 10 is provided with a database 11 for use in locating the mobile units. Database 11 relates radio signal characteristics for signals between mobile unit 17 and access points 12, 14, 16, 18 to locations within the area within which mobile unit 17 operates. In one arrangement, the database may relate signal strength at the access point receivers, measured by an RSSI function of the receivers to location within the area. Alternately the database may relate signal time of arrival to location. It should be understood that the signals on which measurements are based may be signals transmitted by the mobile unit 17 and received by the access points 12,14,16, 18, or alternatively, signals sent by the access points and received by the mobile unit 17. In the latter case the signal characteristics are measured by the mobile unit and data characterizing signals received by the mobile unit is sent by data communications to computer 10.

Computer 10 is arranged to compare data representing signal characteristics, as measured by either mobile unit 17 or access points 12, 14,16, 18, and sent as a data communication over network 13, to database 11 to determine location for the mobile unit. In some cases there can be more than one possible location based on the radio signal characteristic data. Computer 10 is arranged to determine the most probable locations for the mobile unit, such as two or three possible locations that have the highest probability.

Probability of a mobile unit being at a particular location can be based on the difference between the data in the database, characterizing the locations closely matching the sampled data, and the data representing sampled radio signal characteristics. Alternately the database can include further data characterizing the quality of radio signal characteristics for locations within the area. The quality characterizing data can be used to assign a probability to possible locations.

Referring to FIG. 2, in response to a first sample of radio signals computer 10 assigns locations and probabilities L1P1, L1P2 and L1P3 for three possible locations for a mobile unit. Where probabilities are assigned based on quality characterization in a database, the database may assign locations within regions 26 and 28, which are between display cases 20, 22 and 24, to have lower probability because of poor signal strength or multipath in these regions.

In response to a second sample of radio signal characteristics computer 10 assigns possible locations and probabilities L2P1, L2P2 and L2P3 for the three most probable locations for the mobile unit 17. In response to a third sample locations and probabilities L3P1, L3P2 and L3P3 are assigned. It will be recognized that some possible locations may have very low probability, for example zero.

After determining possible locations for two or three samples, computer 10 determines second probabilities for each possible location determined in the third sample. The second probability is based on proximity of the movement of the mobile unit between locations determined in the sequential samples. For example, if three samples are used, the computer calculates second probabilities for each third location, for example with respect to location L3P1, MP1131 for movement from location L1P1 to location L3P1, MP2131 for motion from location L2P1 to location L3P1, MP1231 motion from location L1P2 to location L3P1, MP2231 for motion from location L2P2 to location L3P1, MP1331 for motion from location L1P3 to location L3P1, and MP2331 for motion from location L2P3 to location L3P1. This process is repeated for each possible location for the third sample. The probabilities axe then combined, such as by assigning a score to each probability and determining the location with the highest score, or by multiplying probabilities. Thus for location L3P1 the combined probability may be computed as:

$$CP(L3P1)=W*P(L1P1)*MP1131*P(L3P1)+W*P(L1P2)*MP1231+$$

$$W*P(L1P3)*MP1331*P(L3P1)+V*P(L2P1)*MP2131*P(L3P1)+V*P(L2P2)*MP2231*-P(L3P1)+V*P(L2P3)*MP2331*P(L3P1)$$

where W and V are weighting factors.

The combined probabilities are computed for the possible locations of the third sample and the location with the highest combined probability is selected as the location of the mobile unit.

In a variation of the invention it may be assumed for each sample, that the mobile unit was at the most probable location selected for the prior samples. Accordingly the combined probability for location at L3P1 would be:

$$CP(L3P1)=W*MP(1-31)*P(L3P1)+V*MP(2-31)*P(L3P1)$$

Where P(1-31) and P(2-31) are the respective probabilities that the mobile unit moved from the most probable locations for samples 1 and 2 to position L3P1.

Further simplification is realized if only two possible locations are selected for each sample or if only two samples are used.

Using the first and second probabilities as described above, the mobile unit location is continuously tracked so that the correct location is likely selected from the probable locations. This is evident in FIG. 2, where because of the improbable movement from L2P1 to L3P1 between samples location L3P2 would most likely be selected for the actual location.

While there have been described what are believed to be the preferred embodiments of the invention, those skilled in the art will recognize that other and further changes and modifications may be made thereto without departing from the spirit of the invention, and it is intended to claim all such changes and modifications as fall within the true scope of the invention.

I claim:

1. A system for locating within an area a mobile unit arranged for a wireless radio communications with fixed devices, wherein location is determined by comparing radio signal characteristics between the mobile unit and the fixed devices to a database relating the radio signal characteristics to location within the area, wherein at least one portion of the area includes a barrier, comprising;
   means for assigning the at least one portion including the barrier with a probability of zero;
   means for taking sequential samples of the radio signal characteristics;
   for each sample of the radio signal characteristics, means for determining two or more possible initial locations for the mobile unit and assigning a location probability that the mobile unit is at each of the possible locations, each location probability modified to account for the barrier;
   for each possible location determined using a sample after an initial sample, means for determining a movement probability that the mobile unit has moved from each possible location for one or more prior samples to the possible location, the movement probability being derived from proximity of the possible location for the one or more prior samples and the possible locations for the current sample, wherein the movement probability is modified by factors including at least the probability of zero for the at least one portion including the barrier of the mobile unit between the possible location for the one or more prior samples and the possible location for a current sample; and
   means for selecting a location for the mobile unit as the most probable location for the current sample based on a combination of the location and movement probabilities.

2. The system as specified in claim 1 wherein the location probability is assigned according to a comparison of the sampled radio signal to radio signal characteristics for the location in the database.

3. The system as specified in claim 1 wherein the database includes data characterizing quality of radio signal characteristics for locations within the area and wherein the location probability is assigned according to the quality characterizing data.

4. The system as specified in claim 1 wherein the movement probability is determined by comparing distance between the locations to expected distance for movement of the mobile unit in a time period between the samples.

5. A system for locating within an area a mobile unit arranged for a wireless radio communications with fixed devices, wherein location is determined by comparing radio signal characteristics between the mobile unit and the fixed devices to a database relating the radio signal characteristics to location within the area, wherein at least one portion the area includes a barrier, comprising;
   means for assigning the at least one portion including the barrier with a probability of zero;

means for taking sequential samples of the radio signal characteristics;

for each sample of the radio signal characteristics, means for determining two or more possible initial locations for the mobile unit and assigning a location probability that the mobile unit is at each of the possible locations, each location probability modified to account for the barrier;

for each possible location determined using a sample after an initial sample, means for determining a movement probability that the mobile unit has moved from a selected location determined for one or more prior samples to the possible location, the movement probability being derived from proximity of the possible location for the one or more prior samples and the possible locations for the current sample, wherein the movement probability is modified by factors including at least the probability of zero for the at least one portion including the barrier of the mobile unit between the possible location for the one or more prior samples and the possible location for a current sample; and means for selecting a location for the mobile unit as the most probable location for the current sample based on a combination of the location and movement probabilities.

6. The system as specified in claim 5 wherein the location probability is assigned according to a comparison of the sampled radio signal to radio signal characteristics for the location in the database.

7. The system as specified in claim 5 wherein the database includes data characterizing quality of radio signal characteristics for locations within the area and wherein the location probability is assigned according to the quality characterizing data.

8. The system as specified in claim 5 wherein the movement probability is determined by comparing distance between the locations to expected distance for movement of the mobile unit in a time period between the samples.

9. A system, comprising:

means for receiving a first sample signal from a mobile unit, the first sample signal including first signal characteristics;

means for comparing the first signal characteristics to a database, the database including characterizing data of a plurality of locations, wherein at least one portion of the locations includes a barrier;

means for assigning the at least one portion including the barrier with a probability of zero;

means for assigning a first set of initial locations of the mobile unit and determining first location probabilities for each initial location of the first set based on the comparison of the first signal characteristics to the database, the first location probabilities being modified to account for the barrier;

means for receiving a further sample signal from the mobile unit, the further sample including further signal characteristics;

means for comparing the further signal characteristics to the database characterizing the plurality of locations;

means for assigning a further set of locations of the mobile unit and determining further location probabilities for each location of the further set based on the comparison of the further signal characteristics to the database, the further location probabilities modified to account for the barrier;

means for determining movement probabilities for each location of the first and the further sets, the movement probabilities being based on a proximity between each of the locations within the first and further sets and the ability of the mobile unit to move between the locations, the movement probabilities being modified to account for the barrier for the mobile unit between locations; and means for combining the first and further location probabilities with the movement probabilities for each of the locations and selecting a location having the highest combined location and movement probabilities as the location of the mobile unit.

10. The system as specified in claim 9 wherein the database includes data characterizing a quality of radio signal characteristics for locations and wherein the location probability is assigned according to the quality characterizing data.

11. The system as specified in claim 9 wherein the movement probability is determined by comparing a distance between the plurality of locations to an expected distance for movement of the mobile unit in a time period between the first and the further samples.

12. A system for locating a mobile unit, comprising:

a computer; and a database, in communication with the computer, relating radio signal characteristics for signals between the mobile unit and a plurality of access points to a plurality of locations of an area in which the mobile unit operates, the computer being programmed to perform the following:

assigning at least one portion of the area that includes a barrier with a probability of zero;

taking sequential samples of the radio signal characteristics;

for each sample of the radio signal characteristics, determining two or more possible initial locations for the mobile unit and assigning a location probability that the mobile unit is at each of the possible locations, each location probability modified to account for the barrier;

for each possible location determined using a sample after an initial sample, determining a movement probability that the mobile unit has moved from each possible location for one or more prior samples to the possible location, the movement probability being derived from proximity of the possible location for the one or more prior samples and the possible locations for the current sample, wherein the movement probability is modified by factors including at least the probability of zero for the at least one portion including the barrier of the mobile unit between the possible location for the one or more prior samples and the possible location for a current sample; and selecting a location for the mobile unit as the most probable location for the current sample based on a combination of the location and movement probabilities.

13. The system as specified in claim 12 wherein the location probability is assigned according to a comparison of the sampled radio signal to radio signal characteristics for the location in the database.

14. The system as specified in claim 12 wherein the database includes data characterizing quality of radio signal characteristics for locations within the area and wherein the location probability is assigned according to the quality characterizing data.

15. The system as specified in claim 12 wherein the movement probability is determined by comparing distance between the locations to expected distance for movement of the mobile unit in a time period between the samples.

16. A system for locating a mobile unit, comprising:

a computer; and a database, in communication with the computer, relating radio signal characteristics for signals between the mobile unit and a plurality of access points to a plurality of locations of an area in which the mobile unit operates, the computer being programmed to perform the following:

assigning at least one portion of the area that includes a barrier with a probability of zero;

taking sequential samples of the radio signal characteristics;

for each sample of the radio signal characteristics, determining two or more possible initial locations for the mobile unit and assigning a location probability that the mobile unit is at each of the possible locations, each location probability modified to account for the barrier;

for each possible location determined using a sample after an initial sample, determining a movement probability that the mobile unit has moved from a selected location determined for one or more prior samples to the possible location, the movement probability being derived from proximity of the possible location for the one or more prior samples and the possible locations for the current sample, wherein the movement probability is modified by factors including at least the probability of zero for the at least one portion including the barrier of the mobile unit between the possible location for the one or more prior samples and the possible location for a current sample; and selecting a location for the mobile unit as the most probable location for the current sample based on a combination of the location and movement probabilities.

17. The system as specified in claim 16 wherein the location probability is assigned according to a comparison of the sampled radio signal to radio signal characteristics for the location in the database.

18. The system as specified in claim 16 wherein the database includes data characterizing quality of radio signal characteristics for locations within the area and wherein the location probability is assigned according to the quality characterizing data.

19. The system as specified in claim 16 wherein the movement probability is determined by comparing distance between the locations to expected distance for movement of the mobile unit in a time period between the samples.

* * * * *

UNITED STATES PATENT AND TRADEMARK OFFICE
CERTIFICATE OF CORRECTION

| | | |
|---|---|---|
| PATENT NO. | : 7,873,368 B2 | |
| APPLICATION NO. | : 12/194785 | |
| DATED | : January 18, 2011 | |
| INVENTOR(S) | : Goren | |

It is certified that error appears in the above-identified patent and that said Letters Patent is hereby corrected as shown below:

In Column 3, Line 37, delete "axe" and insert -- are --, therefor.

Signed and Sealed this
Thirty-first Day of July, 2012

David J. Kappos
*Director of the United States Patent and Trademark Office*